Feb. 12, 1946.    C. W. MacMILLAN    2,394,792
ENGINE IGNITION CONTROLLING DEVICE
Filed June 12, 1943    5 Sheets-Sheet 5

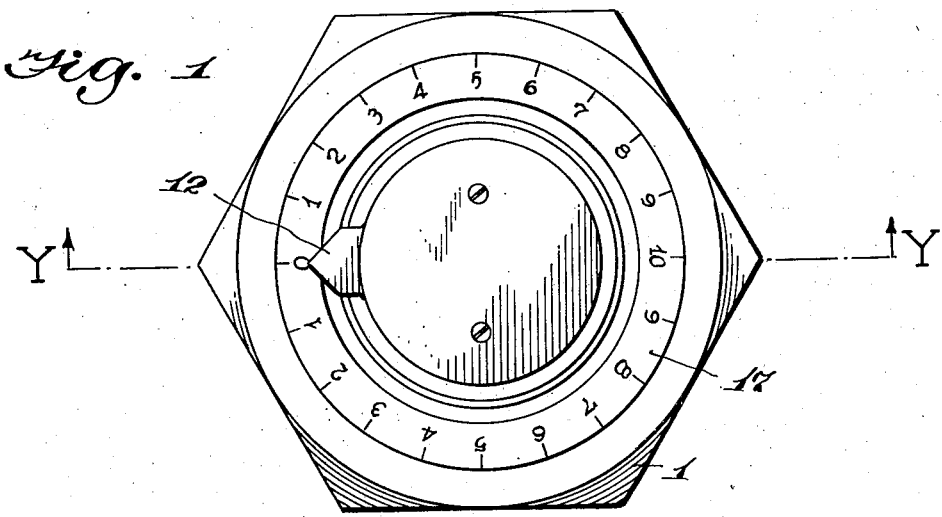
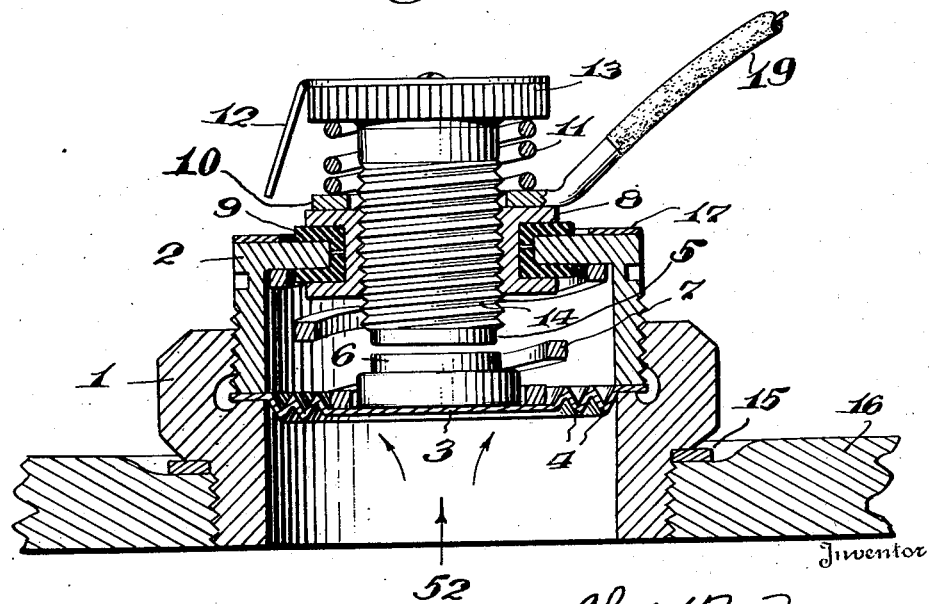

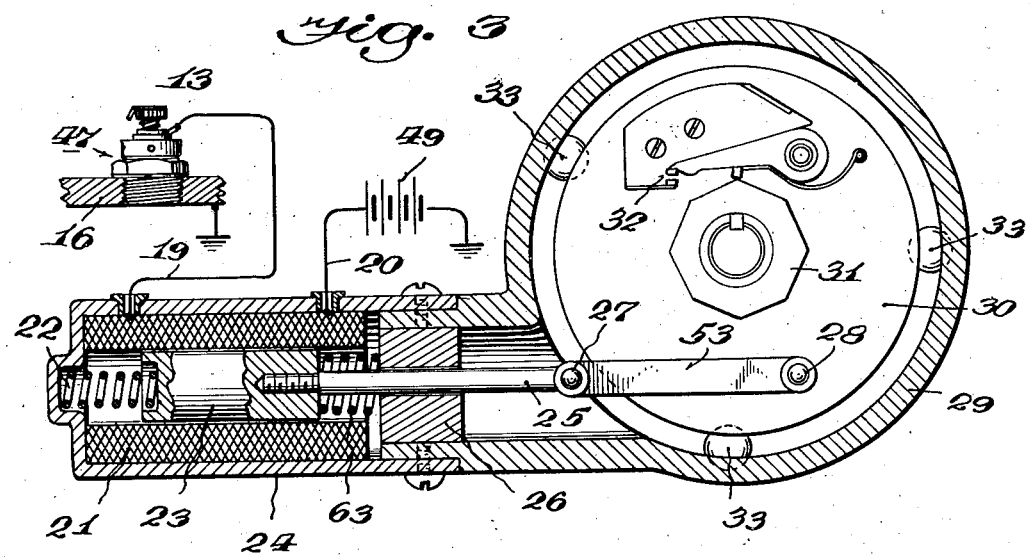
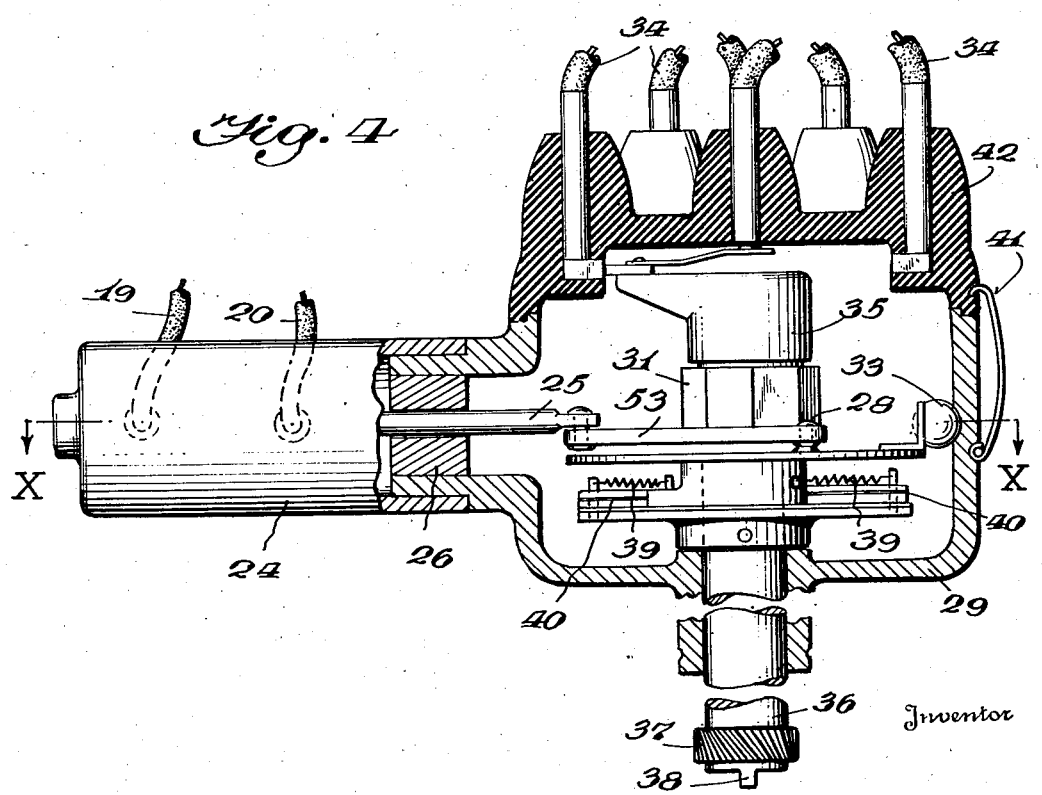

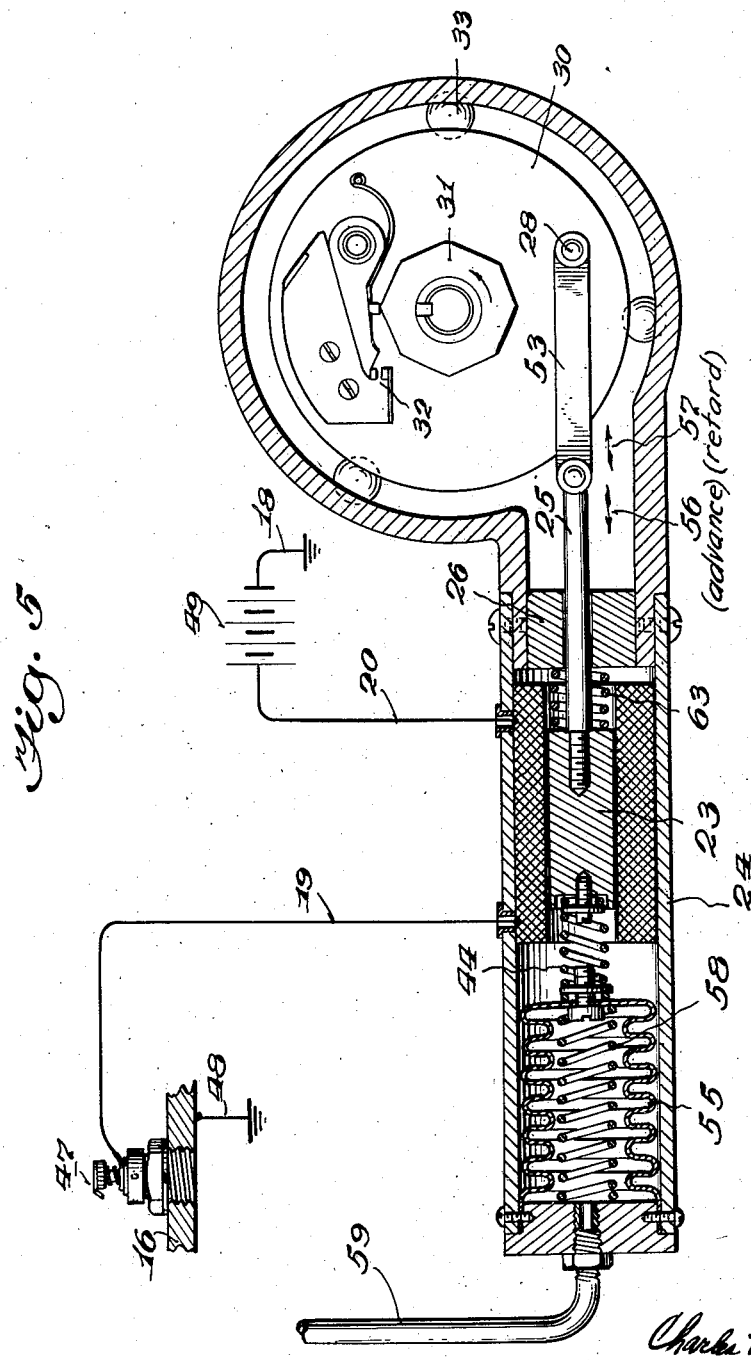

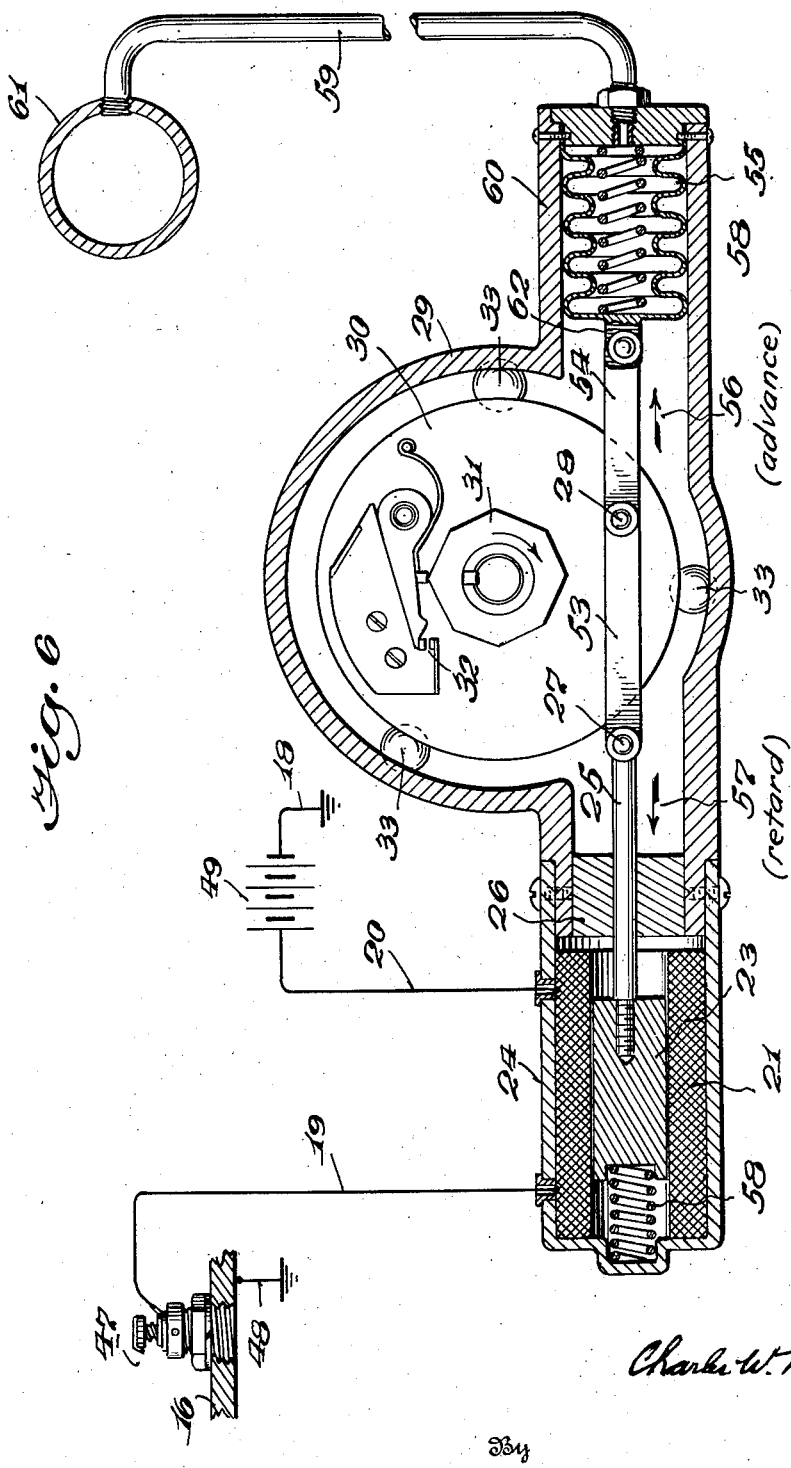

Inventor
Charles W. MacMillan
By
Attorney

Patented Feb. 12, 1946

2,394,792

UNITED STATES PATENT OFFICE 2,394,792

ENGINE IGNITION CONTROLLING DEVICE

Charles W. MacMillan, Washington, D. C.

Application June 12, 1943, Serial No. 490,677

9 Claims. (Cl. 123—117)

Due to different characteristics in the design of various internal combustion engines, the use of fuels, such as gasoline, having a given octane or "anti-knock" rating, results in unsatisfactory operation unless special compensating adjustments are made in the ignition timing for each individual engine. Experience and tests performed by the current "Cooperative Fuel Research Committee" and others have proved this to be the case, not only with engines of different design, but with individual engines of the same design, make, and model. The problem of providing for satisfactory engine combustion is further complicated by the variation in commercial fuels. This variation in grades of commercial gasolines is well known and involves, among other things, wide differences in "anti-knock" characteristics or "octane rating." In this connection, the subject of "detonation" in internal combustion engines is essentially involved and is assumed to be generally understood.

The object of this device is to provide automatic means which, when coordinated with the ignition system of any internal combustion engine, will permit operation under all load conditions with fuels of various octane ratings without "detonation," or pre-ignition, and at maximum overall efficiency. In other words, the device is designed to obtain the maximum power mechanically and thermodynamically available in any grade of gasoline, without "knocks" regardless of the engine characteristics or the load under which it must operate.

An additional purpose is to augment the present commercial vacuum and centrifugal means of ignition timing control in automotive engines by a control based on engine cylinder pressure and the rate of rise of this pressure.

Representative means of accomplishing the objects referred to above are illustrated in drawings Figures 1 to 7, which are briefly described as follows:

Fig. 1 is a plan view of that part of the device which is inserted into the cylinder head of the engine and is responsive to the pressure therein.

Fig. 2 is a vertical cross section of Fig. 1 taken through Y—Y.

Fig. 3 is a horizontal cross section of that part of the device incorporating an ignition distributor and taken on line X—X of Fig. 4, which is a partial section of an elevation of this part.

Fig. 5 is a sectional view of an arrangement of the distributor device incorporating conventional vacuum diaphragm or bellous control for counter-clockwise rotation of the distributor including centrifugal control of ignition timing, as well as cylinder pressure control of same.

Fig. 6 is a similar arrangement for clockwise rotation of the distributor (top view).

Figure 7:
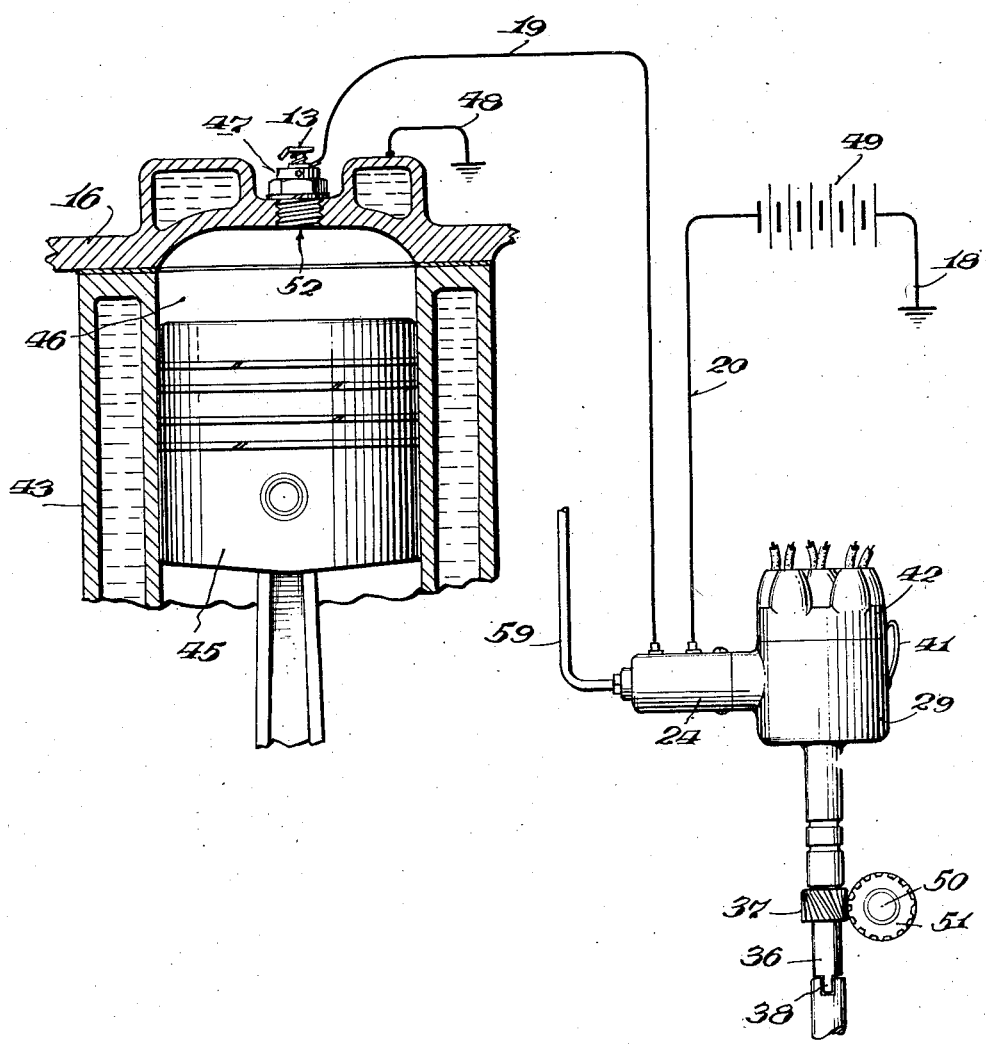
Fig. 7 is a schematic diagram of the device, showing a partial section of an engine cylinder with the pressure responsive unit in place together with the electrical wiring circuit connecting same with the distributor unit and source of current.

A detailed description of the various parts of the device is as follows: in Figures 1 and 2, numeral 1 is a threaded body with hexagonal head adapted to fit tapped hole in cylinder head 16. A circular threaded piece 2 fits threads cut in the upper part of body 1 and holds a flexible diaphragm 3, securely sealing its upper side from engine cylinder gases which enter at 52. Diaphragm 3 is preferably circular and contains concentric corrugations 4, which permit slight movement in response to gas pressures within the engine cylinder. The upper side of diaphragm 3 integrally contains an electrical contact surface 6 which mates with upper contact 5 when sufficient cylinder pressure forces diaphragm 3 upward. Spring 7 (shown in cross section) is calibrated and together with diaphragm 3 resists closing of the contact points 5 and 6. Upper contact point 5 is adjustable so as to vary the gap distance between points 5 and 6, this adjustment being accomplished by means of threads 14, which mate with the tapped grommet 8. An insulating sleeve 9 is inserted in the upper circular opening of piece 2 so as to electrically insulate contacts 5 and 6 from each other. A circular dial plate 17 is attached to the upper surface of piece 2 and is calibrated to indicate the gap opening between points 5 and 6. Pointer 12 is attached to knurled head 13 and indicates the gap setting. Spring 11 applies pressure on contact washer 10 to which electric conductor 19 is attached. A gasket 15 is used between the body 1 and cylinder head 16.

In Figures 3 and 4 a distributor housing is indicated by 29 and distributor cap by 42, held together by conventional spring clamps 41. Other conventional parts of the distributor assembly include a rotor 35, high tension conductors 34, cam 31, distributor drive shaft 36, gear 37, oil pump shaft drive key 38, centrifugal advance weights 40, calibrated springs 39, breaker points 32, breaker plate 30, and breaker plate ball bearings 33. An electric solenoid is indicated by 21 housed in case 24 which is removably attached to the distributor housing. The solenoid winding 21 is indicated in section in Fig. 3 and its terminals 19 and 20 are brought through grommets in the case 24. An armature or solenoid plunger 23 is held resiliently from movement within the solenoid by calibrated spring 22, and its connection to the breaker plate through links 25 and 53 which are pivoted at 27 and 28. A bearing 26 acts as a guide for sliding link 25 and also produces a controlled damping effect on said link.

The preferred arrangement of the distributor unit is illustrated in Fig. 5 in which 59 is a vacuum connecting tube which communicates with the vaporizing chamber of the carburator immediately before the butterfly valve position. Tube 59 being connected at one end to diaphragm or bellows 55 provides a partial vacuum in same during certain phases of engine operation. Springs 58 and 63 together with resilent connection 44 retain bellows 55 and armature 23 resiliently in place with housing 24 and solenoid 21, as previously described in connection with Figs. 3 and 4. The solenoid leads 19 and 20 are shown schematically connecting with the pressure responsive unit 47 and a storage battery 49 respectively. The circuit is completed through ground 48 (which represents the engine cylinder head-to-chassis connection) and lead 18 which is the battery ground conductor. The distributor arrangment illustrated in Fig. 5 is for counter-clockwise rotation of the distributor cam when viewed from the top.

Fig. 6 is a re-arrangement of the parts shown in Fig. 5 in order to accommodate clockwise rotation of the distributor cam. In this arrangement, an extension 60 of the distributor housing 29 is provided to house the diaphragm or bellows 55 which is connected to the breaker plate 30 through link 62.

Fig. 7 illustrates schematically the complete device as it is assembled in connection with an engine and battery. The engine cylinder head is indicated by 16 and is provided with a properly designed recess and tapped hole to receive pressure responsive unit 47, the adjusting head of which is indicated by 13. The cylinder block shown partially by 43 contains conventional engine piston and rod assemblies as illustrated by 45. The combustion chamber 46 communicates directly with the pressure unit at 52. Conductors 48, 19, 20, and 18 complete the circuit through the battery, pressure responsive unit, and distributor solenoid.

In order to describe the operation of the device and to clearly distinguish between what is old and what is claimed as new in the art, reference is first made to Figs. 1, 2, 3, and 4 which show a working construction of the bare essential elements only, which operate as follows. When detonation tends to occur within the engine combustion chamber, it is accompanied by an exceptionally rapid pressure rise, which is sufficient to displace diaphragm 3 (Fig. 2) upward against calibrated spring 7, thus closing contacts 5 and 6. This action closes the electric circuit of the complete device causing a current to flow through conductors 19 and 20 and thus through solenoid winding 21 (Fig. 3). Current flowing through the solenoid winding produces a magnetic flux which acts upon armature 23, causing the latter to move axially to the left, thus rotating breaker plate 30 clockwise (viewed from top) through a limited number of degrees. This action retards the engine ignition timing by delaying the opening of distributor contact points 32, assuming clockwise rotation of the distributor cam 31. If the engine design is such that distributor cam 31 rotates counter-clockwise, the retarding action may be obtained by reversing the solenoid leads 19 and 20, thus reversing the direction of magnetic flux whence armature piece 23 moves to the right causing breaker plate to rotate counter-clockwise.

It is evident that rotation of the breaker plate as described above, will occur only when current flows through the solenoid winding, or only when contacts 5 and 6 (Fig. 1) close due to excessive combustion chamber pressure. When this pressure is not excessive or when detonation ceases contacts 5 and 6 separate thus breaking the electric circuit and releasing the magnetic force on armature 23, whence springs 22 and 63 return it and breaker plate 30 to their normal position. Positive and smooth response to detonation pressures is obtained by proper design of the various parts, taking into consideration a frictional drag on sliding arm 25 in bearing 26 and the inertia of various moving parts. Convenient adjustment or recalibration of the device is provided for by means of the threaded contact piece 14, by means of which the gap between contacts 5 and 6 (Fig. 2) may be increased or decreased when knurled head 13 is turned manually.

The device as described in connection with Figs. 3 and 4 illustrates the features of the pressure responsive unit in combination with the distributor solenoid unit. These units and their interdependent relation and combination is believed to be new in the art. The preferred embodiment of these elements is in combination with conventional centrifugal and vacuum ignition advance controls as adapted to modern ignition distributors. Having set forth the bare essentials of the new device, its practical operating combination will be more readily understood.

This practical arrangement of the device as illustrated in Fig. 5, operates as follows. When detonation tends to occur, contacts 5 and 6 (Fig. 1) close, causing current to flow from battery 49 through solenoid winding 21, thus moving armature 23 to the right against spring 63 and retarding the ignition by rotating breaker plate 30 counter-clockwise as viewed from the top. This retarding action is independent of the ignition advancing functions of bellows 55 (Fig. 5) and centrifugal weights 40 (Fig. 4). As engine speed increases it is desirable to advance the ignition timing and this is accomplished automatically by the centrifugal force of weights 40 moving outward to shift cam 31 and rotor 35 (Fig. 4) clockwise on distributor shaft 36 as viewed from the top. This conventional centrifugal means of advance is augmented by a conventional vacuum means of advance produced by partial collapse of bellows 55 to the left when a vacuum is created in connecting tube 59. Movement of bellows 55 to the left also moves attached armature 23 with links 25 and 53 to the left, thus rotating breaker plate clockwise and advancing the ignition timing. It should be noted that the distributor shaft rotates counter-clockwise in this design. When the vacuum in bellows 55 is reduced, spring 58 returns the armature, bellows, and breaker plate assembly to the normal position in which it is resiliently held by springs 58 and 63.

Since sufficient vacuum is developed for movement of the bellows only when the engine is operating under a relatively light load, bellows 55 will be held collapsed fully or partially only when the engine load is light. When the engine load is large due either to a constantly applied load or rapid acceleration the engine manifold vacuum is reduced considerably. Coincidently it is under these conditions that detonation would tend to occur whence armature 21 moves to the right due to current flowing in the solenoid, thus retarding the timing of the ignition spark. Since, at this same time when detonation tends to occur, the vacuum in bellows 55 is coincidently reduced so as to be substantially ineffective, the solenoid action on armature 55 is effective and the latter is free to move to the right in retarding the ignition timing. Resilient connecting means 44 between bellows 55 and armature 23 also permits retarding action of the solenoid in the event bellows 55 tends to restrain same due to too great a vacuum force.

In the case of a distributor designed for clockwise rotation of the rotor, it is desirable to arrange the vacuum bellows unit as illustrated in Fig. 6. Such an arrangement simplifies the mechanical linkage of the vacuum advance which must move to the right in rotating breaker plate 30 counter-clockwise for spark advancement.

It is contemplated that only one cylinder of a multi-cylinder engine will require insertion of pressure unit 47. However, two or more cylinders may contain this unit if desired.

Having described and illustrated the parts and operation of the device, and having set forth those features which are new in contrast to conventional ignition timing control devices, the following is claimed:

1. An automatic detonation controlling device comprising, in combination with an internal combustion engine, a pressure responsive electrical switch, said electrical switch being operated by combustion chamber gas pressure; a solenoid connected in electric circuit with said switch; an ignition distributor embodying vacuum and centrifugal ignition control means, said distributor being responsive to an armature-plunger of said solenoid; a direct current source and circuit conductors connecting in electrical series said current source, solenoid, and switch.

2. An ignition controlling device comprising an ignition distributor, said distributor containing integral spark timing adjusting means; said adjusting means comprising three independently functioning mechanical features, namely, a vacuum operated linkage, an electrically operated linkage, and a centrifugal operated linkage; an electric circuit controlling unit, said unit containing resilient pressure-responsive means responsive to the combustion chamber of an internal combustion engine; an electric current source connected in circuit with controlling unit and said distributor.

3. An automatic detonation controlling device comprising, in combination with an internal combustion engine, pressure responsive electrical control means, said means being operably associated with combustion chamber gas pressure; a solenoid connected in electric circuit with said means; an ignition distributor embodying vacuum and centrifugal ignition control means, said distributor being associated with an armature-plunger of said solenoid; a direct current source, and circuit conductors connecting in electrical series with said current source, solenoid, and electrical control means.

4. In a device of the class described, the combination of three independent ignition control means and an internal combustion engine; said means comprising a pressure-responsive electrical control communicating with a combustion chamber of said engine and also communicating with an electro-magnetic control unit, said electro-magnetic control unit being associated operably with a spark retarding mechanism in the engine ignition distributor; a vacuum-responsive control unit communicating with the intake manifold system of said engine and with a spark retarding mechanism operably associated with the engine ignition distributor; and a speed-responsive control unit communicating with a spark advance mechanism operably associated with the engine distributor.

5. An ignition controlling device comprising electromagnetically operated adjusting means and an ignition distributor in combination with independent vacuum and centrifugal spark timing adjusting linkages, said electromagnetic means communicating with an electric current control, said control communicating with a combustion chamber of an internal combustion engine.

6. An ignition controlling device comprising the combination of a source of electric current connected in a series circuit with electrical contacts and an electric solenoid; an engine ignition distributor embodying independent centrifugal and vacuum spark adjusting means; said electric contacts being responsive to combustion chamber gas pressure, and said distributor embodying additional spark adjusting means mechanically communicating with a plunger of said solenoid for the purpose set forth.

7. An engine ignition controlling device comprising an ignition distributor embodying independent vacuum and centrifugal spark advancing means; an electromagnetically operated mechanical linkage communicating with said vacuum spark advancing means; electric contacts being operably responsive of engine combustion chamber gas pressure; said electrical contacts and electromagnetic operating means being disposed in circuit with a source of electric current for the purpose described.

8. An engine ignition controlling device comprising an engine distributor embodying independent vacuum and centrifugal spark advancing means; an electromagnetically operated mechanical linkage communicating with said centrifugal spark advancing means; electrical contacts being operably responsive of engine combustion chamber gas pressure; said electrical contacts and electromagnetic operating means being arranged in circuit with a source of electric current for the purpose described.

9. An engine ignition controlling device comprising the combination of an electrical contactor, and an electric solenoid connected in series with a source of current; an engine ignition distributor mechanically and operably connected with the plunger of said solenoid; said electric contactor consisting of a threaded body adapted to communicate with an engine combustion chamber, a flexible diaphragm, an adjustably fixed electrical contact point, a movable electric contact point mounted on said diaphragm, a calibrated spring, electrical insulating means between conducting parts supporting said points, all assembled with said threaded body; said electric solenoid consisting of an electromagnetic coil, an armature piece magnetically associated with said coil; said distributor consisting of a rotary driven shaft, breaker plate, cam, rotor, ignition breaker points, centrifugal weight adjusting means and vacuum controlled adjusting means disposed operably with said rotor and said breaker plate respectively and for conventional operation with the other elements of said distributor; said armature piece and said breaker plate being mechanically connected for mutual motion and responsive of the operation of said contactor and said solenoid for the purpose set forth.

CHARLES W. MACMILLAN.